(12) United States Patent
Bryskin et al.

(10) Patent No.: US 9,026,632 B2
(45) Date of Patent: May 5, 2015

(54) NETWORK WITH A NETWORK WIDE EXTENDED POLICY FRAMEWORK

(75) Inventors: Igor Bryskin, Great Falls, VA (US); Vishnu Beeram, Fairfax, VA (US); Wes Doonan, Fairfax, VA (US)

(73) Assignee: ADVA Optical Networking SE, Meiningen OT Dreissigacker (DE)

( * ) Notice: Subject to any disclaimer, the term of this patent is extended or adjusted under 35 U.S.C. 154(b) by 162 days.

(21) Appl. No.: 13/421,353

(22) Filed: Mar. 15, 2012

(65) Prior Publication Data

US 2013/0246593 A1 Sep. 19, 2013

(51) Int. Cl.
*G06F 15/173* (2006.01)
*H04L 12/24* (2006.01)
*G06F 15/177* (2006.01)

(52) U.S. Cl.
CPC ............ *H04L 41/08* (2013.01); *H04L 41/0893* (2013.01); *H04L 41/0873* (2013.01); *H04L 41/0672* (2013.01)

(58) Field of Classification Search
CPC ..... H04L 41/00; H04L 41/08; H04L 41/0672; H04L 41/0873; H04L 41/0893; H04L 45/02
USPC .................................................. 709/221, 223
See application file for complete search history.

(56) References Cited

U.S. PATENT DOCUMENTS

| | | | |
|---|---|---|---|
| 6,578,076 B1 * | 6/2003 | Putzolu | 709/223 |
| 2004/0193912 A1 | 9/2004 | Li et al. | |
| 2005/0120099 A1 * | 6/2005 | Marce et al. | 709/221 |
| 2006/0048142 A1 * | 3/2006 | Roese et al. | 717/176 |
| 2006/0072471 A1 * | 4/2006 | Shiozawa | 370/248 |
| 2007/0019558 A1 * | 1/2007 | Vasseur et al. | 370/248 |
| 2008/0247314 A1 | 10/2008 | Kim et al. | |
| 2010/0131650 A1 * | 5/2010 | Pok et al. | 709/226 |

FOREIGN PATENT DOCUMENTS

| | | | | |
|---|---|---|---|---|
| EP | 1 538 777 A1 | 6/2005 | | |
| WO | WO 2009026849 A1 * | 3/2009 | | H04L 29/12 |

OTHER PUBLICATIONS

Extended European Search Report from related Application EP 12159626, dated Jun. 26, 2012, 10 pages.

(Continued)

*Primary Examiner* — Hee Soo Kim
(74) *Attorney, Agent, or Firm* — Norton Rose Fulbright US LLP; Erik G. Swenson

(57) ABSTRACT

A network with a network wide extended policy framework comprising: path computation clients (PCCs), associated with at least one local policy enforcement point (PEP); path computation servers (PCSs), associated with at least one policy decision point (PDP). The PEPs and PDPs adapted to exchange attributes determined by at least one PDP. PDPs are adapted to identify network elements/network services requiring identical configuration parameters by evaluating parameters advertised in the network and update policy related to identified groups in case of configuration error. Updated policy is distributed by PDP in policy notification to PEPs associated with network elements/network services of identified group. The PEPs receiving policy notification comprising updated policy from PDP adapted to translate the updated policy into configuration settings of network elements/network services the identified group.

16 Claims, 3 Drawing Sheets

(56) References Cited

OTHER PUBLICATIONS

Durham, et al., "The COPS (Common Open Policy Service) Protocol", Jan. 1, 2000, 39 pages, XP015008531.

Gharbaoui, et al. "Behavior-based Policies for preserving Confidentiality in PCE-based Multi-Domain MPLS networks", 2011 IEEE International Symposium on Policies for Distributed Systems and Networks, Jun. 6, 2011, pp. 81-88.

\* cited by examiner

NETWORK WITH A NETWORK WIDE EXTENDED POLICY FRAMEWORK

TECHNICAL BACKGROUND

Network operators control networks via network and service management means. There are various network policy frameworks such as described in RFC 2251 or the X500 directory access protocol (ISO/IEC 9594) which constitute large and complex software packages. This kind of conventional network policy frameworks are not only complex but also require a significant amount of memory and processing capacity. These conventional network policy frameworks are used mainly for providing policy management on hosts and servers but are normally not installed on network elements of the network. Other conventional network policy frameworks such as based on COPS (RFC 2748) are lacking functionalities such as a dynamic mutual auto-discovery of policy decision points PDP and policy enforcement points PEP. In the conventional network policy frameworks policy decision points PDPs cannot identify and correct configuration errors. Further, the policy decision points PDPs are not able to assign configured values dynamically or react in an appropriate manner to real time network events such as outages and other unplanned events within the network. Accordingly, there is a need for a network wide extended policy framework which overcomes the above-mentioned drawbacks.

SUMMARY OF THE INVENTION

The invention provides a network with a network wide extended policy framework comprising:
path computation clients each being associated with at least one local policy enforcement point,
path computation servers associated with at least one policy decision point,
wherein the policy enforcement points and said at least one policy decision point are adapted to exchange attributes which are determined by at least one policy decision point,
wherein at least one policy decision point is adapted to identify a group of network elements and/or network services requiring an identical set of configuration parameters by evaluating parameters advertised into the network and to update a policy related to said identified group in case of a detected configuration error,
wherein said updated policy is distributed by the policy decision point in a policy notification to the policy enforcement points associated with the network elements and/or network services of said identified group; and
wherein said policy enforcement points receiving said policy notification comprising said updated policy from said policy decision point are adapted to translate the received updated policy into configuration settings of said network elements and/or network services of said identified group.

In a possible embodiment of the network according to the present invention a policy decision point is adapted to update a policy related to said identified group of network elements and/or network services in real time in response to a detected real time network event.

In a possible embodiment of the network according to the present invention a path computation client of said network comprises a client application requesting a path computation to be performed by a path computation server.

In a further possible embodiment of the network according to the present invention the path computation server of said network is adapted to compute a network path based on a topology of a network domain of said network and the information received in response to said path computation request.

In a further possible embodiment of the network according to the present invention the policy decision point of the network has access to a traffic engineering database which comprises traffic engineering information including network element and/or network service attributes advertised by network elements of said network domain of said network.

In a further possible embodiment of the network according to the present invention traffic engineering information stored in the traffic engineering database comprises topology data and resource information data of the network domain.

In a further possible embodiment of the network according to the present invention a policy decision point is adapted to detect a configuration error if network elements and/or network services advertise conflicting configuration parameter values as attributes.

In a further possible embodiment of the network according to the present invention the policy decision point is adapted to detect a configuration error if the same network address or the same network element identification is advertised as attributes by two or more network elements of the same network domain of said network.

In a further possible embodiment of the network according to the present invention the policy decision point is adapted to distribute a request for an automatic reconfiguration with non-conflicting configuration parameter values to the policy enforcement points associated with the network elements and/or network services of the network domain.

In a further possible embodiment of the network according to the present invention the policy decision point is adapted to update a resource classification and/or configuration policy in response to a detected network element failure.

In a further possible embodiment of the network according to the present invention the policy decision point is adapted to update a policy to instruct network elements to reconfigure their links by adding or removing said links and/or bandwidth advertised by said links depending on a detected current date traffic load.

The invention further provides a policy decision point for a network comprising:
an identification module adapted to identify a group of network elements and/or network services requiring an identical set of configuration parameters by evaluating advertised attributes;
a detection module adapted to detect a configuration error on the basis of the configuration parameters; and
a policy updating module adapted to update a policy related to said identified group of network elements and/or network services in case of a detected configuration error.

In a possible embodiment of the policy decision point according to the present invention the policy decision point of the network has access to a traffic engineering database comprising traffic engineering information including network element and/or network service attributes advertised by network elements of a network domain of the network.

In a further possible embodiment of the policy decision point according to the present invention the policy updating module is adapted to update dynamically the policy related to said identified group of network elements and/or network services in response to a detected real time network event affecting a network element and/or a network service of the identified group.

The invention further provides a method for performing a network policy control for a network comprising path computation clients associated with at least one local policy enforcement point and path computation servers associated with at least one policy decision point, wherein the method comprises the steps of:

determining attributes exchanged between policy enforcement points and policy decision points;

identifying by said policy decision point a group of network elements and/or network services requiring an identical set of configuration parameters by evaluating said advertised attributes to update a policy related to said identified group in case of a detected configuration error;

distributing by said policy decision point the updated policy in a policy notification to the policy enforcement points associated with the identified group of network elements and/or network services; and translating by said policy enforcement point locally the updated policy within the received policy notification into configuration settings of the network elements and/or network services of the identified group.

In a possible embodiment of the method according to the present invention the policy decision point updates a policy related to the identified group of network elements and/or network services in real time in response to a detected real time or scheduled network event affecting a network element and/or a network service of the identified group.

In a further possible embodiment of the method according to the present invention the attributes comprising network element attributes and/or network service attributes are exchanged between the policy enforcement points and the policy decision points by means of an extended path computation element communication protocol.

In a further possible embodiment of the method according to the present invention the updated policy is distributed by the policy decision point to said policy enforcement points within policy notifications by means of the extended path computation element communication protocol.

The invention further provides a computer program comprising instructions for performing a method for performing a network policy control for a network comprising path computation clients associated with at least one local policy enforcement point and path computation servers associated with at least one policy decision point, wherein the method comprises the steps of:

determining attributes exchanged between policy enforcement points and policy decision points, identifying by said policy decision point a group of network elements and/or network services requiring an identical set of configuration parameters by evaluating said advertised attributes to update a policy related to said identified group in case of a detected configuration error;

distributing by said policy decision point the updated policy in a policy notification to the policy enforcement points associated with the identified group of network elements and/or network services; and translating by said policy enforcement point locally the updated policy within the received policy notification into configuration settings of said network elements and/or network services of said identified group.

The invention further provides a data carrier which stores such a computer program for performing a network policy control for a network.

BRIEF DESCRIPTION OF FIGURES

In the following possible embodiments of the network with a network wide extended policy framework for a method for performing a network policy control for such a network are described with reference to the enclosed figures.

DETAILED DESCRIPTION OF EMBODIMENTS

Figure 1:
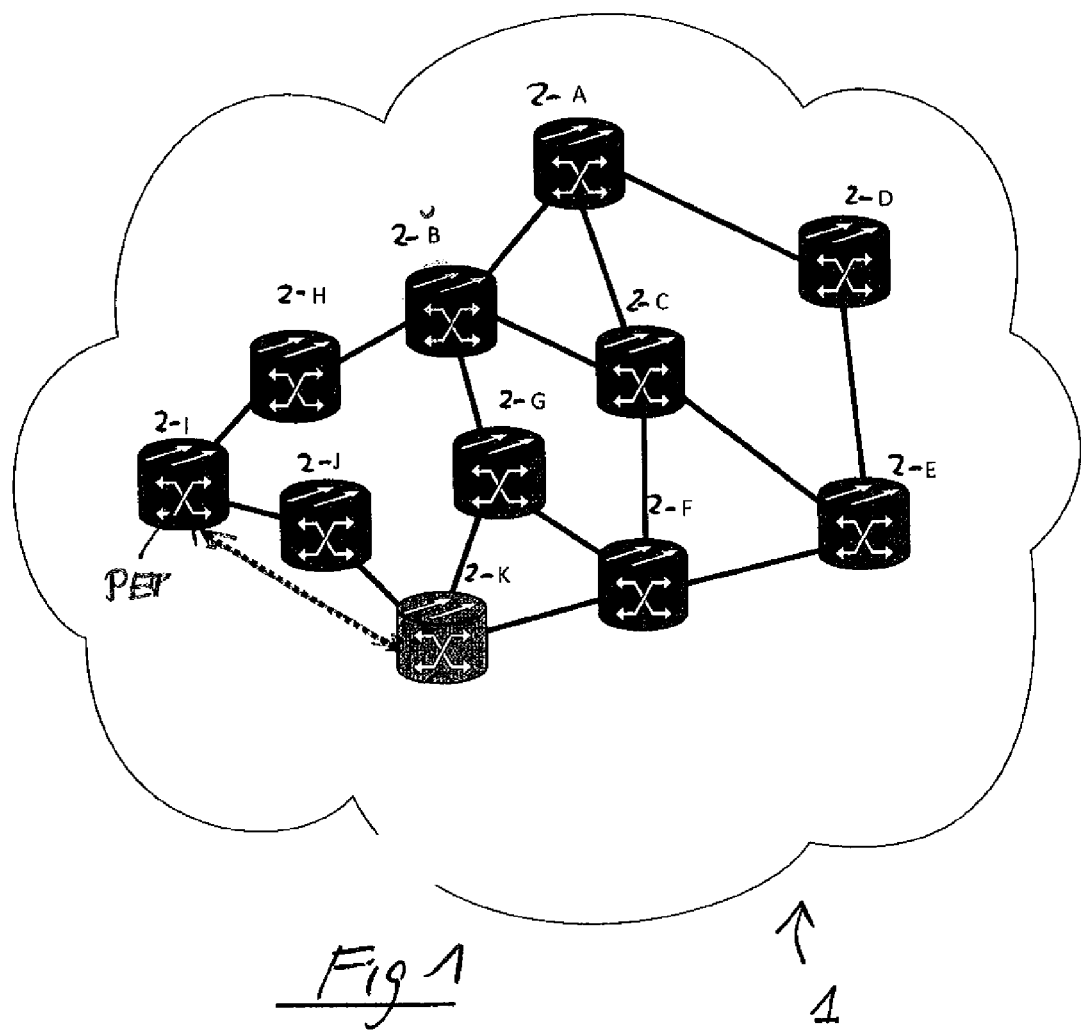
FIG. 1 shows an exemplary embodiment of a network with a network wide extended policy framework according to the present invention.

As can be seen in FIG. 1 a network 1 can comprise a plurality of network elements communicating with each other via links. The network elements can comprise network entities such as network nodes connected to each other via wireless or wired links. As shown in embodiment of FIG. 1 several nodes 2-A to 2-K are shown linked to each other via bidirectional data links. The network 1 comprises path computation clients PCCs associated with at least one local policy enforcement point PEP and path computation servers PCSs associated with at least one policy decision point PDP. The network 1 comprises at least one policy decision point PDP. As shown in example of FIG. 1 node 2-B and the node 2-K each form a policy decision point PDP, wherein the node 2-B operates for example as a backup power decision point PDP. In the network 1 according to the present invention each path computation client PCC can be associated with at least one local policy enforcement point PEP. The path computation client PCC can be any client application requesting a path computation to be performed by a path computation element PCE or a local policy enforcement point PEP. The path computation element or policy enforcement point PEP can be formed by an entity such as a component application or network node that is capable of computing a network path or route, for example based on a network graph applying computational constraints. The network 1 further comprises path computation servers PCSs associated with at least one policy decision point PDP. The path computation clients PCCs and the path computation servers PCSs are adapted to exchange attributes advertised to the at least one policy decision point PDP such as the policy decision point 2-K shown in FIG. 1. The policy decision point PDP such as the policy decision point 2-K is adapted to identify a group of network elements or network services within the network 1 requiring an identical set of configuration parameters CP by evaluating the received advertised attributes and to update a policy related to said identified group of network elements and/or network services in case of a detected configuration error.

Figure 2:
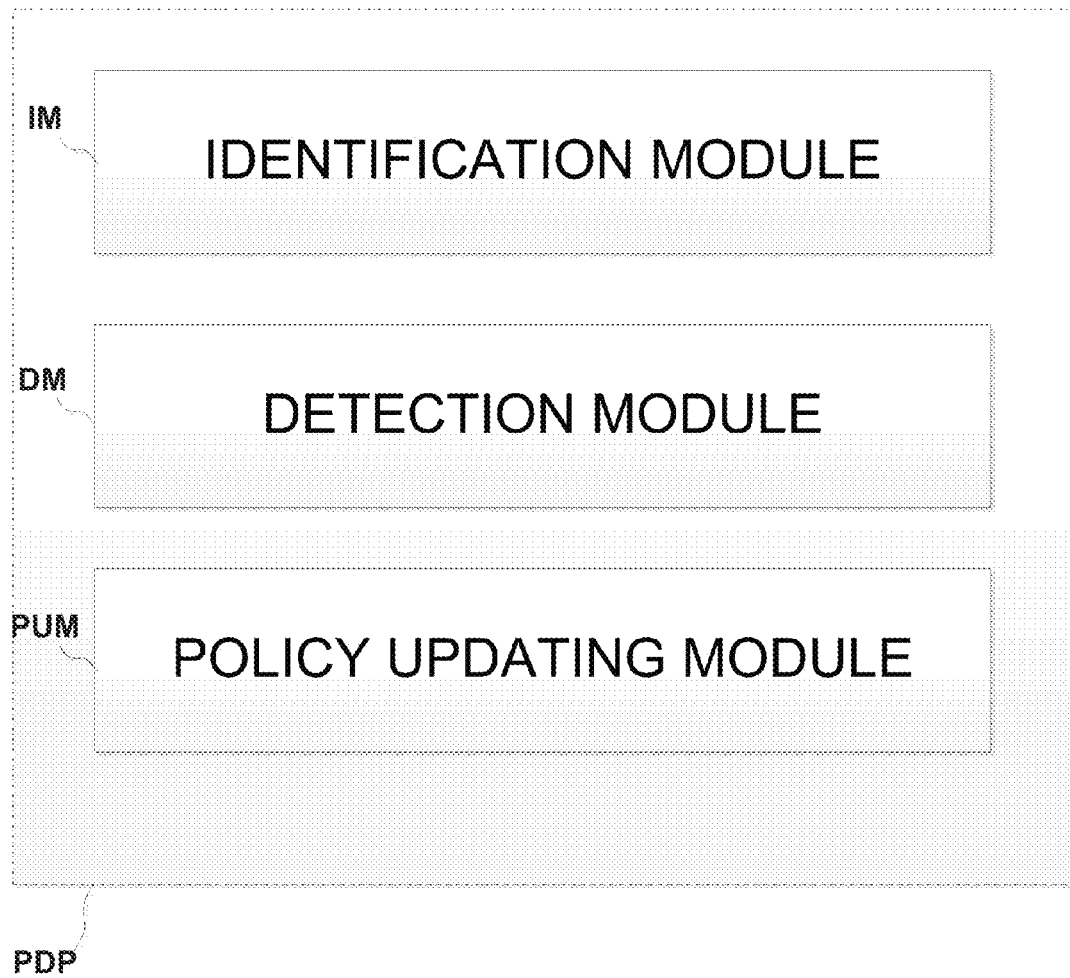
FIG. 2 shows a block diagram of a possible embodiment of a policy decision point according to the present invention as employed by the network shown in FIG. 1.

FIG. 2 shows a block diagram of a possible embodiment of a policy decision point PDP such as the policy decision point 2-K shown in FIG. 1. As can be seen in FIG. 2 the policy decision point PDP comprises an identification module IM adapted to identify a group of network elements and/or network services requiring an identical set of configuration parameters CP wherein the identification module IM identifies the group of network elements and/or network services requiring an identical set of configuration parameters CP by evaluating the advertised attributes. These attributes are exchanged between the path computation clients PCCs and the path computation servers PCSs and are advertised to the policy decision point PDP. The policy decision point PDP further comprises a detection module DM adapted to detect a configuration error on the basis of the configuration parameters CPs provided by the identification module IM. The policy decision point PDP further comprises a policy updating module PUM adapted to update a policy related to the identified group of network elements and/or network services in case of a detected configuration error. The policy decision point PDP of the network 1 can have access to a traffic engineering database TED comprising traffic engineering information including network element or network service attributes advertised by the network elements of a network domain of the network 1. The policy updating module PUM is adapted to update dynamically the policy related to the identified group of network elements and/or network services in response to a detected real time or scheduled network event affecting a network element and/or a network service of the identified group of network elements or network services.

The updated policy provided by the policy updating module PUM is distributed by the policy decision point PDP such as the policy decision point 2-K of the network 1 in at least one policy notification to the policy enforcement points PEPs associated with the network elements and/or network services of the identified group. A policy enforcement point PEP such as the policy enforcement point 2-I as shown in FIG. 1 receiving the policy notification comprising the updated policy from the policy decision point PDP 2-K is adapted to translate the received updated policy into configuration settings of the network elements or network services of the identified group.

The policy decision point PDP can detect a configuration error if network elements and/or network services in the network 1 advertise conflicting configuration parameter values as attributes. The detection is performed by the detection module DM of the policy decision point PDP as shown in FIG. 2. The detection module DM detects a configuration error, for example if the same network address or the same network element identification is advertised as attributes by two or more network elements of the same network domain of the respective network 1. In a possible embodiment the policy decision point PDP further distributes a request for an automatic reconfiguration with non-conflicting configuration parameter values to the policy enforcement points PEPs associated with the network elements or network services of the respective network domain. The policy decision point PDP is adapted in a possible implementation to update a resource classification or configuration policy in response to a detected network element failure. The policy decision point PDP can also update a policy to instruct network elements to reconfigure the links by adding or removing the links or bandwidth advertised by the links depending on a detected current data traffic load.

Figure 3:
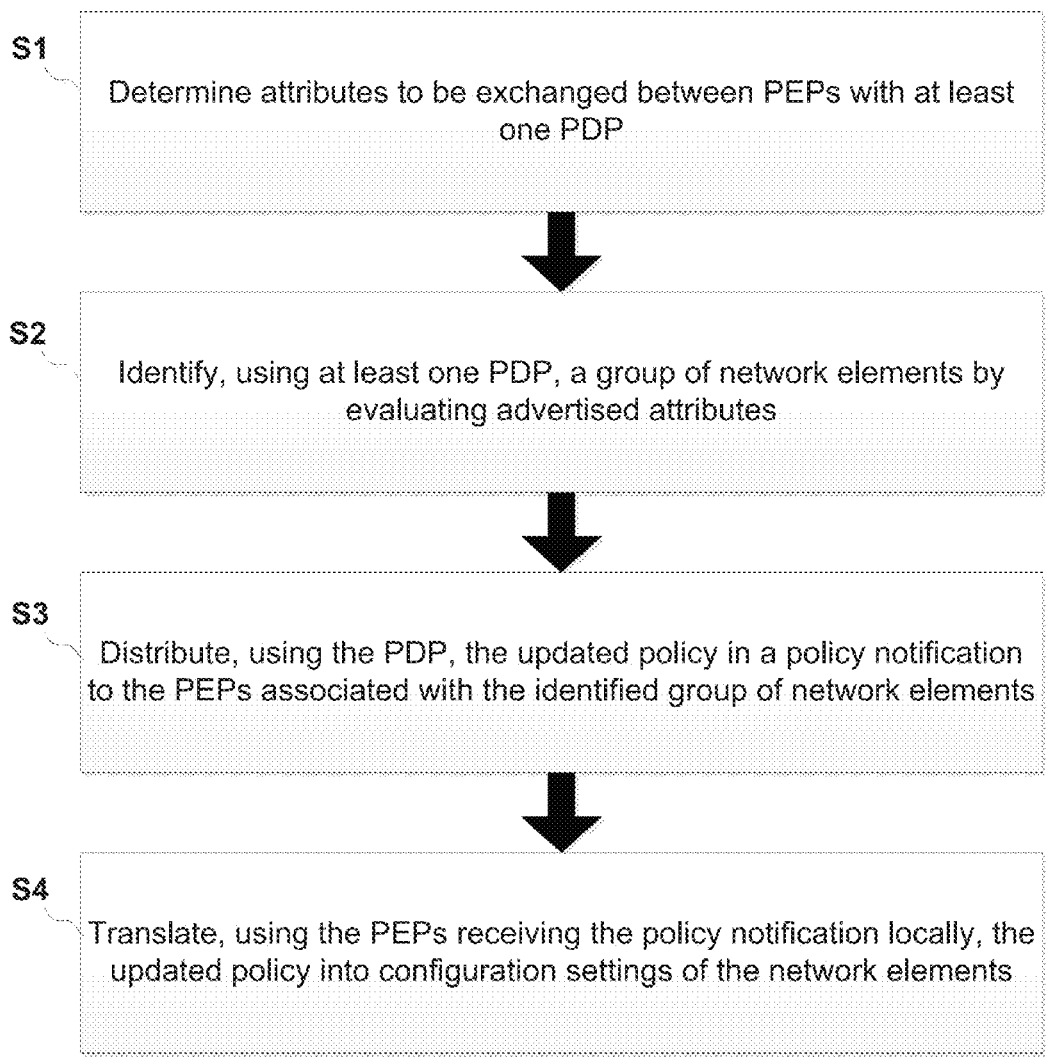
FIG. 3 shows a flow chart for illustrating a possible embodiment of a method for performing a network policy control according to the present invention.

FIG. 3 shows a flow chart of a possible implementation of a method for performing a network policy control for a network such as network 1 according to the present invention.

In a first step S1 attributes which are exchanged between policy enforcement points PEPs with the at least one policy decision point PDP are determined. The attributes can comprise network element attributes or network service attributes exchanged between policy enforcement points PEPs and the policy decision point PDP such as the policy decision point 2-K in FIG. 1 by means of an extended path computation element communication protocol PCEP.

In a further step S2 a group of network elements and/or network services requiring an identical set of configuration parameters CPs are identified by the at least one policy decision point PDP 2-K by evaluating the advertised attributes to update a policy related to the identified group in case of a detected configuration error. In a possible implementation the policy decision point PDP detects the configuration error if network elements or network services advertise conflicting configuration parameter values as attributes. For example, the policy decision point PDP can detect a configuration error, if the same network address of the same network element identification is advertised as attributes by two or more network elements of the same network domain within the network 1.

In a further step S3 the policy decision point PDP distributes the updated policy in a policy notification to the policy enforcement points PEPs associated with the identified group of network elements or network services. The updated policy can be distributed by the policy decision point through the policy enforcement point in step S3 within policy notifications by means of the extended path computation element communication protocol PCEP.

In a further step S4 the policy enforcement point PEP receiving the policy notification locally translates the updated policy into configuration settings of the network elements or network services of the identified group.

By means of the employed extended path computation element communication protocol PCEP the path computation clients PCCs and the path computation servers PCSs can exchange arbitrary information, in particular policy information. It is possible that the path computation clients PCCs and the path computation servers PCSs can also exchange path computation requests and responses. It is possible to designate one or more network path computation servers PCSs for network policy management purposes by associating them within one or more policy decision points PDPs. Further, every network path computation client PCC can be associated with one or several local policy enforcement points PEPs. It is possible to manage the network policies either locally on path computation clients PCCs or remotely from any network element connected to a path computation server PCS via the extended path computation element communication protocol PCEP. The policies from the path computation servers PCSs can be distributed to pertinent or associated path computation clients PCCs using the extended path computation element communication protocol PCEP so that the associated policy enforcement points PEPs can perform an automatic network element reconfiguration. The path computation servers PCSs can use intrinsic data stored in an associated traffic engineering database TED for the purposes of automatic detection of configuration errors and for the dynamic assignment of configuration parameters CPs and direct reaction to various real time network events.

In a possible embodiment the network 1 can be a transport wavelength division multiplexer WDM network with optical links between the network nodes. A transport wavelength division WDM network normally requires a great deal of tedious and error-prone manual configuration which has to be performed by highly qualified personnel. With the method according to the present invention the network configuration can be automated. This is achieved by using a network wide policy framework. A set of network element interfaces and/or services that require an identical set of configuration is identified. The configuration sequence and parameters CPs can be managed within a single repository associated with the policy decision point PDP and distributed to the policy enforcement points PEPs associated with each network element interface and/or service from the identified set wherein the policy enforcement point PEP locally translates the policies into actual local configurations.

Using a policy configuration server as a part of a network policy center has the advantage that as a consumer of the information stored in a domain traffic engineering database TED the policy configuration server is capable of integrating the traffic engineering information advertised into the network 1 by every network element of the network. Therefore, the path computation server PCS is capable of detecting configuration errors, for example if the same IP address or the same system name is advertised by two or more different network elements. The path computation server PCS can then request an automatic reconfiguration with non-conflicting values. As a centralized system a path computation server PCS is capable of assuring that non-conflicting values are assigned to network element attributes that can be dynamically assigned, for example, network unique shared risk node/link group IDs. Through the associated traffic engineering database TED the path computation server PCS is constantly kept aware of the operational configuration and status of all network elements of the network 1 enabling it to dynamically update the related policies. One example is updating resource classification policies in response to network failures. Another example is updating policies that instruct network elements to reconfigure the links by adding or removing capacity depending on the current traffic load. Likewise, through the standard PCS auto-discovery procedures the path computation clients PCCs and consequently all network elements can be updated in real time about the state or status of all path computation servers PCSs performing the policy control function. Consequently, a PDP/PEP mutual auto-discovery can be provided without any additional efforts. The employed path computation element communication protocol PCEP is a reliable bidirectional protocol which also can address all the necessary security and authentication requirements of the policy framework. Therefore, it provides an adequate PDP/PEP communication mechanism. The existing PCS redundancy infrastructure also makes it possible to meet the necessary high availability requirements for a policy management center. In a possible embodiment network 1 can be an MPLS/MPLS TE-enabled network. This network can comprise a designated PCS node acting as the policy decision point PDP and another path computation server PCS acting as a backup policy decision point PDP. For example, in the network of FIG. 1 the policy decision point PDP can be formed by the policy decision point 2-K and the backup policy decision point PDP might be formed by the network node 2-B. The method according to the present invention allows to update a default value of an entity globally across the network 1. If, for example, the default RSVP refresh interval is 30 seconds for all RSVP enabled interfaces in the network 1 and there are e.g. 1.000 such interfaces in the network 1 spread across 200 nodes, an operator might decide to change the existing refresh interval of 30 seconds to a new refresh interval having 40 seconds. In this example the operator initiates a policy on the policy decision point PDP to update the refresh interval on all RSVP enabled interfaces in the network 1. Then the policy decision point PDP sends a policy notification via the extended PCEP to all policy enforcement points PEPs in the network 1. The policy enforcement points PEPs enforce the policy locally by updating the RSVP refresh interval on all local RSVP enabled interfaces.

The method of the present invention further allows selective updates, i.e. updating an existing policy selectively across the network 1. If, for example, a current recovery policy for wavelength division multiplexing WDM services in the network is to have no "restoration" capability and a customer X wants all the services of (e.g. all 100 of them) carrying his traffic to have "restoration" capability the policy enforcement is performed as follows. First, the operator initiates a policy on the policy decision point PDP to make all the services catering to customer X be "restorable". In a further step the policy decision point PDP sends a policy notification via the extended PCEP to all the policy enforcement points PEPs that are carrying services pertinent to customer X. Finally, the policy enforcement points PEPs enforce the policy locally by updating the recovery policy of all the services belonging to customer X.

The invention claimed is:

1. A network with a network wide extended policy framework comprising:
    path computation clients each being associated with at least one local policy enforcement point;
    path computation servers associated with at least one policy decision point;
    wherein said policy enforcement points and said at least one policy decision point are adapted to exchange attributes which are determined by said at least one policy decision point;
    wherein said attributes are exchanged between the path computation clients and path computation servers and are advertised to the policy decision point;
    wherein said policy decision point is adapted to identify a group of network elements and/or network services requiring an identical set of configuration parameters by evaluating parameters advertised into the network and to update a policy related to said identified group in case of a detected configuration error;
    wherein said policy is undated dynamically in response to a detected real time or scheduled network event affecting a network element and/or a network service of the identified group,
    wherein said at least one policy decision point is associated with one or more network path computation servers (PCSs) for network policy management;
    wherein said updated policy is distributed by said policy decision point in a policy notification to the policy enforcement points (PEPS) associated with the network elements and/or network services of said identified group;
    wherein said policy enforcement points receiving said policy notification comprising said updated policy from said policy decision point are adapted to translate the received updated policy into configuration settings of said network elements and/or network services of said identified group; and
    wherein a path computation client of said network comprises a client application requesting a path computation to be performed by a path computation server.
2. The network according to claim 1,
    wherein said policy decision point is adapted to update a policy related to said identified group of network elements and/or network services in real time in response to a detected real time network event.
3. The network according to claim 1,
    wherein the path computation server of said network is adapted to compute a network path based on a topology of a network domain of said network and the information received in response to said path computation request.
4. The network according to claim 1,
    wherein said policy decision point of said network has access to a traffic engineering database which comprises traffic engineering information including network element and/or network service attributes advertised by network elements of said network domain of said network.
5. The network according to claim 4,
    wherein said traffic engineering information stored in the traffic engineering database comprises topology data and resource information data of said network domain.

6. The network according to claim 1,
wherein said policy decision point is adapted to detect a configuration error if network elements and/or network services advertise conflicting configuration parameter values as attributes.

7. The network according to claim 6,
wherein said policy decision point is adapted to detect a configuration error if the same network address or the same network element identification is advertised as attributes by two or more network elements of the same network domain of said network.

8. The network according to claim 7,
wherein said policy decision point is adapted to distribute a request for an automatic reconfiguration with non-conflicting configuration parameter values to the policy enforcement points associated with the network elements and/or network services of said network domain.

9. The network according to claim 2,
wherein said policy decision point is adapted to update a resource classification and/or configuration policy in response to a detected network element failure.

10. The network according to claim 2,
wherein said policy decision point is adapted to update a policy to instruct network elements to reconfigure their links by adding or removing said links and/or bandwidth advertised by said links depending on a detected current data traffic load.

11. A policy decision point for a network with a path computation client, the policy decision point comprising:
an identification module adapted to identify a group of network elements and/or network services requiring an identical set of configuration parameters by evaluating advertised attributes;
a detection module adapted to detect a configuration error on the basis of the configuration parameters; and
a policy updating module adapted to update a policy related to said identified group of network elements and/or network services in case of a detected configuration error,
wherein said policy updating module is adapted to update dynamically the policy related to said identified group of network elements and/or network services in response to a detected real time or scheduled network event affecting a network element and/or a network service of the identified group,
wherein a path computation client of said network comprises a client application requesting a path computation to be performed by a path computation server; and
wherein the policy decision point is associated with one or more network path computation servers (PCSs) for network policy management.

12. The policy decision point according to claim 11,
wherein said policy decision point of said network has access to a traffic engineering database comprising traffic engineering information including network element and/or network service attributes advertised by network elements of a network domain of said network.

13. A method for performing a network policy control for a network comprising path computation clients associated with at least one local policy enforcement point and path computation servers associated with at least one policy decision point,
wherein said at least one policy enforcement point is associated with one or more network path computation servers (PCSs) for network policy management;
wherein the method comprises the steps of:
determining attributes exchanged between path computation clients (PCCs) and path computation servers and advertised to policy decision points;
identifying by said policy decision point a group of network elements and/or network services requiring an identical set of configuration parameters by evaluating said advertised attributes to update a policy related to said identified group in case of a detected configuration error;
wherein said attributes are exchanged between the path computation clients (PCCs) and the path computation servers (PCSs) and are advertised to the policy decision point (PDP);
wherein said policy is updated dynamically in response to a detected real time or scheduled network event affecting a network element and/or a network service of the identified group,
distributing by said policy decision point the updated policy in a policy notification to the policy enforcement points associated with the identified group of network elements and/or network services; and
translating by said policy enforcement point locally the updated policy within the received policy notification into configuration settings of said network elements and/or network services of said identified group,
wherein a path computation client of said network comprises a client application requesting a path computation to be performed by a path computation server.

14. The method according to claim 13,
wherein said policy detection point updates a policy related to said identified group of network elements and/or network services in real time in response to a detected real time or scheduled network event affecting a network element and/or a network service of the identified group.

15. The method according to claim 13,
wherein the attributes comprising network element attributes and/or network service attributes are exchanged between the Policy Enforcement Points and the Policy Decision Points by means of an extended path computation element communication protocol.

16. The method according to claim 15,
wherein the updated policy is distributed by said policy decision point to said policy enforcement points within policy notifications by means of said extended path computation element communication protocol.

* * * * *